(12) United States Patent
Zhou et al.

(10) Patent No.: US 9,052,429 B2
(45) Date of Patent: Jun. 9, 2015

(54) BACKLIGHT MODULE AND LIQUID CRYSTAL DISPLAY DEVICE USING THE SAME

(71) Applicant: SHENZHEN CHINA STAR OPTOELECTRONICS TECHNOLOGY CO., LTD., Shenzhen, Guangdong (CN)

(72) Inventors: Gege Zhou, Guangdong (CN); Dehua Li, Guangdong (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 189 days.

(21) Appl. No.: 13/812,071

(22) PCT Filed: Nov. 16, 2012

(86) PCT No.: PCT/CN2012/084739
§ 371 (c)(1),
(2) Date: Jan. 24, 2013

(87) PCT Pub. No.: WO2014/000369
PCT Pub. Date: Jan. 3, 2014

(65) Prior Publication Data
US 2014/0063412 A1    Mar. 6, 2014

(30) Foreign Application Priority Data

Jun. 29, 2012   (CN) .......................... 2012 1 0222260

(51) Int. Cl.
*G02F 1/1333* (2006.01)
*F21V 8/00* (2006.01)
*G02F 1/1335* (2006.01)

(52) U.S. Cl.
CPC .......... *G02B 6/0088* (2013.01); *G02F 2201/46* (2013.01); *G02F 1/133615* (2013.01); *G02F 1/133308* (2013.01); *G02B 6/0081* (2013.01); *G02F 2001/133314* (2013.01)

(58) Field of Classification Search
CPC ........................................... G02F 2001/133328
See application file for complete search history.

(56) References Cited

U.S. PATENT DOCUMENTS

| 2006/0109616 A1* | 5/2006 | Lee et al. ...................... 361/681 |
| 2008/0088764 A1* | 4/2008 | Son et al. ....................... 349/58 |
| 2010/0271845 A1 | 10/2010 | Chiu |

FOREIGN PATENT DOCUMENTS

| CN | 2613780 | 4/2004 |
| CN | 101943806 | 1/2011 |

(Continued)

*Primary Examiner* — Wen-Ying P Chen
(74) *Attorney, Agent, or Firm* — Muncy, Geissler, Olds & Lowe, P.C.

(57) ABSTRACT

A backlight module comprises a backplate assembly and a light guide unit. The backplate assembly comprises a first backplate unit and a second backplate unit. The first backplate unit comprises a first backplate body and a plurality of first upper hooks. The first upper hooks are formed on a front side of the first backplate body. The second backplate unit comprises a second a backplate body and a plurality of first notches. The first lateral notches are formed on a back side of the second backplate body. The first upper hooks are respectively engaged with the first notches to form a complete backplate assembly. The first backplate unit is separated from the second backplate unit due to the expansion value of the light guide unit when the light guide unit expands in a horizontal direction by heat.

9 Claims, 7 Drawing Sheets

(56) References Cited

FOREIGN PATENT DOCUMENTS

| CN | 102313210 | 1/2012 |
| JP | 2010008939 | 1/2010 |
| TW | 200720766 | 6/2007 |

\* cited by examiner

BACKLIGHT MODULE AND LIQUID CRYSTAL DISPLAY DEVICE USING THE SAME

BACKGROUND

1. Field of Invention

The present invention relates to a backlight module and a liquid crystal display device, and more particularly to a backlight module having a backplate capable of extending according to the expansion of a light guide plate and a liquid crystal display device using the same.

2. Related Art

In the field of the backlight module of the liquid crystal display device, with an increase in the size of screen of the liquid crystal display device, miniaturization is also required; therefore, the edge-illumination type backlight unit is a first priority choice. In order to meet the specification of the illumination of screens, the numbers of the light source module and the driving power are increased accordingly, such that thermal energy produced by the light source module increases as the total power thereof increases. The light source of the edge-illumination type backlight unit is disposed on the side wall of the backplate, such that the thermal energy is concentrated and the members of the backlight module expand by heat to pressurize each other, and then the members are damaged.

Referring to FIGS. 1 and 2, FIG. 1 illustrates a conventional backlight module, and FIG. 2 is a cross-sectional view of the conventional backlight module along the line A-A of FIG. 1.

A backlight module 1 comprises a backplate unit 11, two light source units 12, two positioning and heat dissipating units 13, a reflection unit 14, a light guide unit 15 and an optical film unit 16. The two light source units 12 are disposed on a side wall of two positioning and heat dissipating unit 13, respectively. Each positioning and heat dissipating unit 13 is equipped on a lateral side of the backplate unit 11, the reflection unit 14 is disposed on the two positioning and heat dissipating units 13, and the light guide unit 15 is disposed between the reflection unit 14 and the optical film unit 16, wherein each light source unit 12 has a light emitting surface 121, the light guide unit 15 comprises two light entrance surfaces 151, the number of the light entrance surface 151 is the same as the number of the light source unit 12, a light coupling distance (d) exists between each light emitting surface 121 and a corresponding light entrance surface 151. A height of the light entrance surface 151 is adjusted to the same as a height of the light emitting surface 121 of the light source unit 12 by the two positioning and heat dissipating units 13.

FIG. 3 is a cross-sectional view of the conventional backlight module along the line A-A of FIG. 1 after the conventional backlight module deforms by heat. As the foregoing, after the thermal energy produced by the two light source units 12 conducts to the reflection unit 14, light guide unit 15, and the optical film unit 16, each unit expands by heat. Because each unit has different heat expansion ratios and the heat expansion ratio of the light guide unit 15 is larger than the heat expansion ratio of the backplate unit 11, the width of the light guide unit 15 is larger than the width of the backplate unit 11 after heat expansion. When the light guide unit 15 expands, the light source unit 12 is pressurized to be broken by the light guide unit 15. Meanwhile, the light guide unit 15 warps and deforms, such that the uniformity of the illuminance of the backlight module 1 is decreased.

The width of the light guide unit 15 is larger than the width of the backplate unit 11 after heat expansion, such that the light guide unit 15 expands by heat to pressurize the light source unit 12; therefore, how to avoid the light source unit to be damaged due to the expansion of the light guide unit is an important problem to be solved.

SUMMARY

One objective of the present invention is to overcome the drawbacks of the conventional backlight unit in that the light guide unit expands by heat to pressurize the light source unit. The present invention provides a backlight module, wherein the backplate extends according to the expansion of the light guide unit, such that the light source unit can't be pressurized by the light guide unit.

Another objective of the present invention is to overcome the drawbacks of the conventional liquid crystal display device in that the light guide unit expands by heat to pressurize the light source unit. The present invention provides a liquid crystal display device, wherein the backplate extends according to the expansion of the light guide unit, such that the light source unit can't be pressurized by the light guide unit.

To solve above-mentioned problems, the present invention provides a backlight module comprising a backplate assembly and a light guide unit.

The backplate assembly comprises a first backplate unit and a second backplate unit. The first backplate unit comprises a first backplate body and a plurality of first upper hooks. The first backplate body is formed with three first side walls and an opening along a front side of the first backplate body, and the first upper hooks are formed on the front side of the first backplate body.

The second backplate unit comprises a second backplate body and a plurality of first notches. The second backplate body is formed with three second side walls and an opening along a back side of the second backplate body. The first notches are formed on the back side, wherein numbers and positions of the first notches are respectively corresponded to numbers and positions of the first upper hooks, the first notches and the first upper hooks are respectively engaged with each other so as to form the complete backplate assembly.

In one embodiment, the first backplate unit further comprises a plurality of second upper hooks formed on the front side and engaged with the second backplate body.

In one embodiment, the first backplate unit further comprises a plurality of third notches formed on the front side, and the second backplate unit further comprises a plurality of first lower hooks formed on the back side, wherein numbers and positions of the third notches are respectively corresponded to numbers and positions of the first lower hooks, the third notches are respectively engaged with the first lower hooks In one embodiment, a width of the front side is slightly larger than a width of the back side, and the front side is disposed on an outer edge of the back side when the first backplate unit is engaged with the second backplate unit, such that the first backplate unit and the second backplate mutually slide in a lateral direction.

In one embodiment, the first backplate unit is separated from the second backplate unit based on an expansion value of the light guide unit when the light guide unit expands in a horizontal direction by heat.

The present invention provides a liquid crystal display device which comprises a liquid crystal module and a backlight module. The backlight module comprises a backplate assembly and a light guide unit. The backplate assembly comprises a first backplate unit and a second backplate unit.

The first backplate unit comprises a first backplate body and a plurality of first upper hooks, wherein the first backplate body is formed with three first side walls and an opening along a front side of the first backplate body, and the first upper hooks are formed on the front side.

The second backplate unit comprises a second backplate body and a plurality of first notches. The second backplate body is formed with three second side walls and an opening along a back side of the second backplate body, and the first notches are formed on the back side, wherein numbers and positions of the first notches are respectively corresponded to numbers and positions of the first upper hooks, the first notches and the first upper hooks are respectively engaged with each other so as to form the complete backplate assembly.

In one embodiment, the first backplate unit further comprises a plurality of second upper hooks formed on the front side and engaged with the second backplate body.

In one embodiment, the first backplate unit further comprises a plurality of third notches formed in the front side, the second backplate unit further comprises a plurality of the first lower hooks formed on the back side, numbers and positions of the third notches are respectively correspond to numbers and positions of the first lower hooks, the third notches are respectively engaged with the first lower hooks.

In one embodiment, a width of the front side is slightly larger than a width of the back side, and the front side is disposed on an outer edge of the back side when the first backplate unit is engaged with the second backplate unit, such that the first backplate unit and the second backplate mutually slide in a lateral direction.

In one embodiment, the first backplate unit is separated from the second backplate unit based on an expansion value of the light guide unit when the light guide unit expands in a horizontal direction by heat.

In conclusion, the backlight module and the liquid crystal display device using the same of the present invention has the following advantageous effect: the backplate assembly can be detached into the first backplate unit and the second backplate unit, With different engaging structures, the backplate assembly extends according to the expansion of the light guide unit. Therefore, the problems that the light source unit is pressurized by the expansion of the light guide unit to be broken is to be solved.

In order to make the aforementioned features and advantages of the present invention more comprehensible, embodiments accompanied with figures are described in detail below.

DETAILED DESCRIPTION

Now, the preferred embodiment of the present invention will be described in detail with reference to the accompanying drawings.

Figure 1:
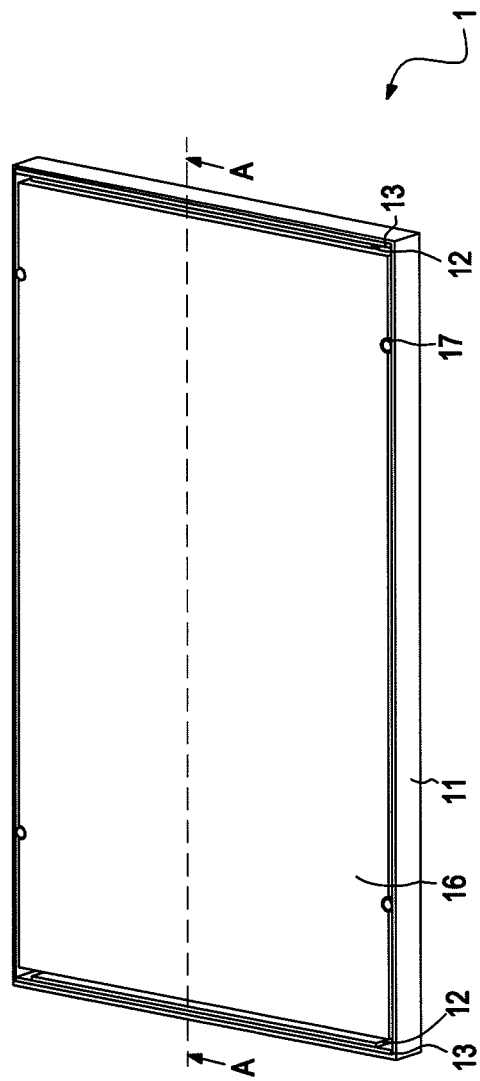
FIG. 1 illustrates a conventional backlight module.
Figure 2:
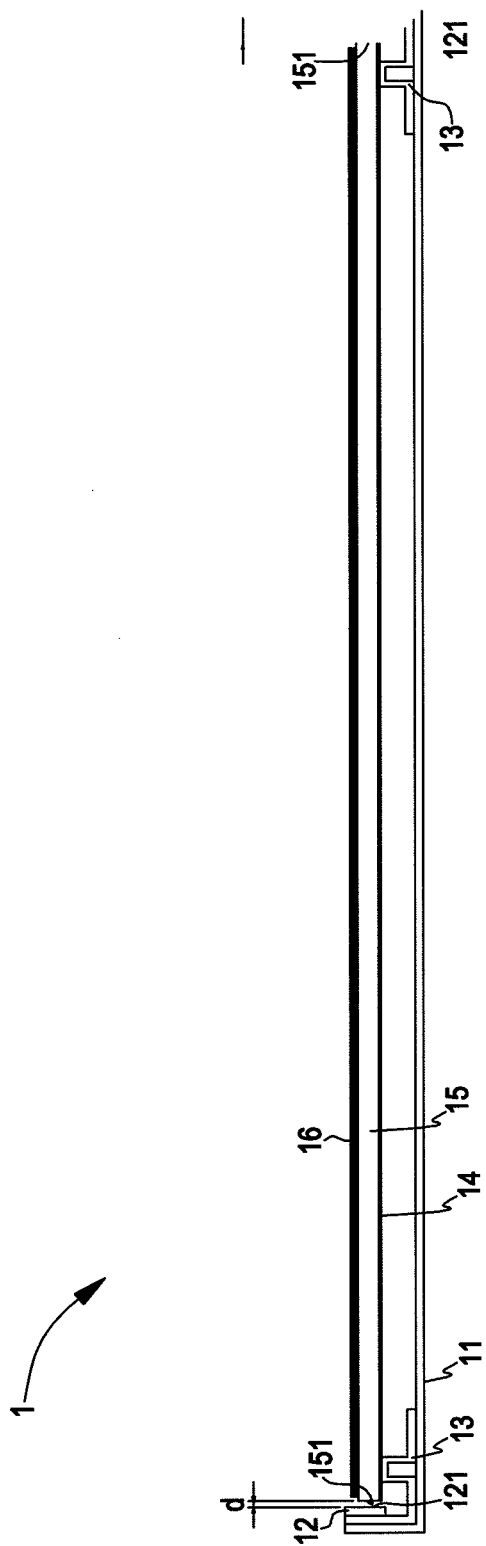
FIG. 2 is a cross-sectional view of the conventional backlight module along the line A-A of FIG. 1.
Figure 3:
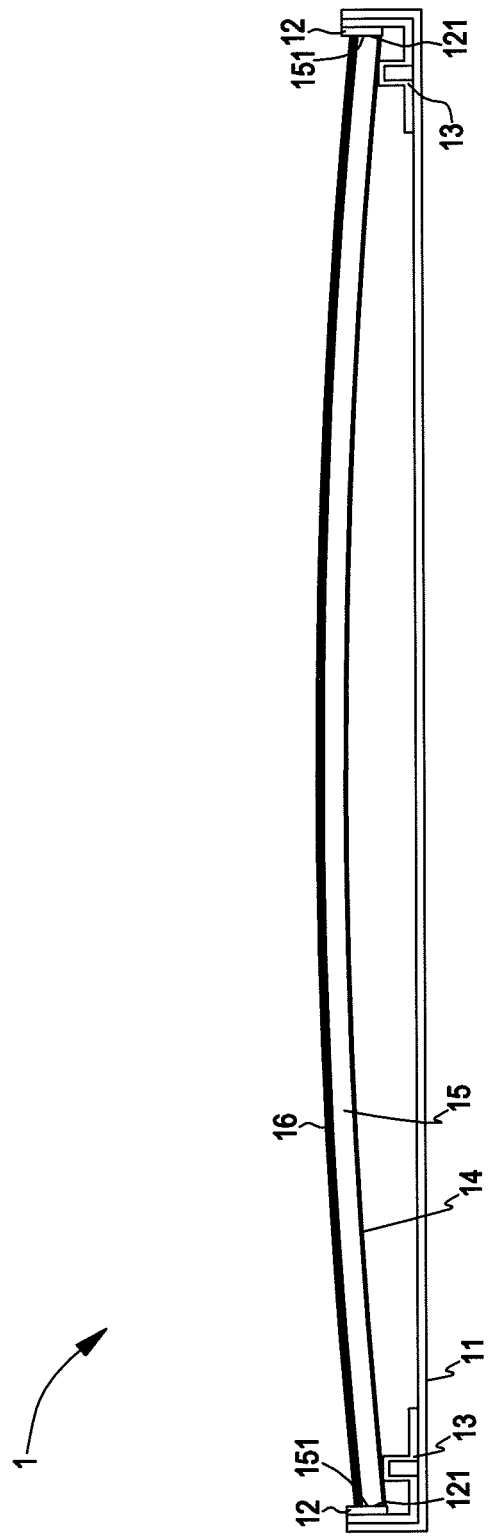
FIG. 3 is a cross-sectional view of the conventional backlight module along the line A-A of FIG. 1 after the conventional backlight module deforms by heat.
Figure 4:
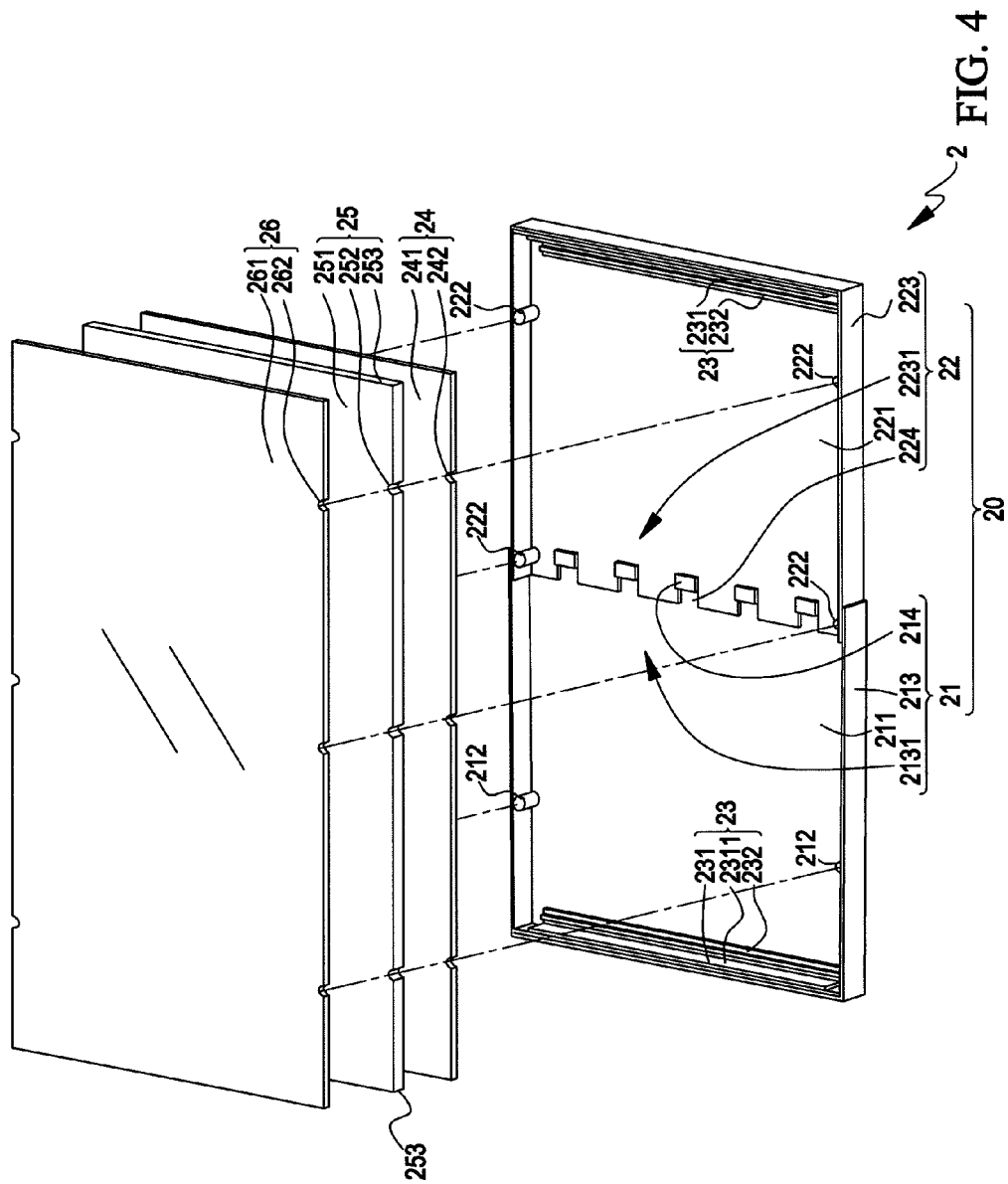
FIG. 4 illustrates an exploded perspective view of a backlight module according to a first embodiment of the present invention.

FIG. 4 illustrates an exploded perspective view of a backlight module according to a first embodiment of the present invention. In the first embodiment, the backlight module 2 comprises a backplate assembly 20, a light source assembly 23, a reflection unit 24, a light guide unit 25, and an optical film unit 26, wherein the light source assembly 23 comprises a light source unit 231 and a positioning and heat dissipating unit 232. The reflection unit 24 is disposed on the backplate assembly 20 and under the light guide unit 25. The optical film unit 26 is disposed on the light guide unit 25. The reflection unit 24 comprises a reflector sheet 241 and a plurality of reflector sheet positioning portions 242. The light guide unit 25 comprises a light guide plate 251, a plurality of light guide plate positioning portions 252, and a light entrance surface 253. The optical film unit 26 comprises an optical film 261 and a plurality of optical film positioning portions 262. The light source unit 231 has a light emitting surface 2311 corresponding to the light entrance surface 253 of the light guide unit 25.

The optical film unit 26 comprises a plurality of diffuser sheets and a plurality of prism sheets, wherein the diffuser sheet may uniformize the light refracted from the light guide unit 25, and the prism sheet may concentrate the light with large angles toward the center.

The backplate assembly 20 comprises a first backplate unit 21 and a second backplate unit 22. The first backplate unit 21 comprises a first backplate body 211, a plurality of first backplate position columns 212, three first backplate side walls 213, an opening along a front side 2131 of the first backplate body 211, and a plurality of first upper hooks 214. The first backplate position columns 212 are inserted in the first backplate body 211, wherein each first backplate positioning column is inserted into a corresponding reflector sheet positioning portion 242, light guide plate positioning portion 252, and optical sheet positioning portion 262, such that the reflection unit 24, the light guide unit 25, and the optical film unit 26 are fixed on the backplate assembly 20.

The three first backplate side walls 213 are respectively formed on the three lateral sides of the first backplate body 211 and the opening is formed along the front side 2131 of the first backplate body 211. The first upper hooks 214 are formed on the front side 2131 of the first backplate body 211.

The second backplate unit 22 comprises a second backplate body 221, a plurality of second backplate positioning columns 222, three second backplate side walls 223, an opening along a back side 2231 of the second backplate body 221, and a plurality of first notches 224. The second backplate positioning columns 222 are inserted in the second backplate body 221, wherein each second backplate positioning column is inserted into a corresponding reflector sheet positioning portion 242, light guide plate positioning portion 252, and optical sheet positioning portion 262, such that the reflection unit 24, the light guide unit 25, and the optical film unit 26 are fixed on the backplate assembly 20.

The three second backplate side walls 223 are respectively formed on the three lateral sides of the second backplate body 221 and the opening is formed along the back side 2231 of the second backplate body 221 The first notches 224 are formed on the back side 2231 of the second backplate body 221, wherein the numbers and positions of the first notches 224 are corresponded to the numbers and positions of the first upper hooks 214, and the first upper hooks 214 and the first notches 224 are respectively engaged with each other to form the complete backplate assembly 20.

In one embodiment, the backlight module 2 further comprises two light source assembly 23, wherein the two light source assembly 23 are respectively disposed on the first backplate side wall 213 of the first backplate unit 21 and the second backplate side wall 223 of the second backplate unit 22, each light source assembly 23 has a positioning and heat dissipating unit 232, and the height of the light entrance surface 253 of the light guide unit 25 is adjusted to the same as the height of the light emitting surface 2311 of the light source unit 231 by the positioning and heat dissipating unit 232.

Figure 5:
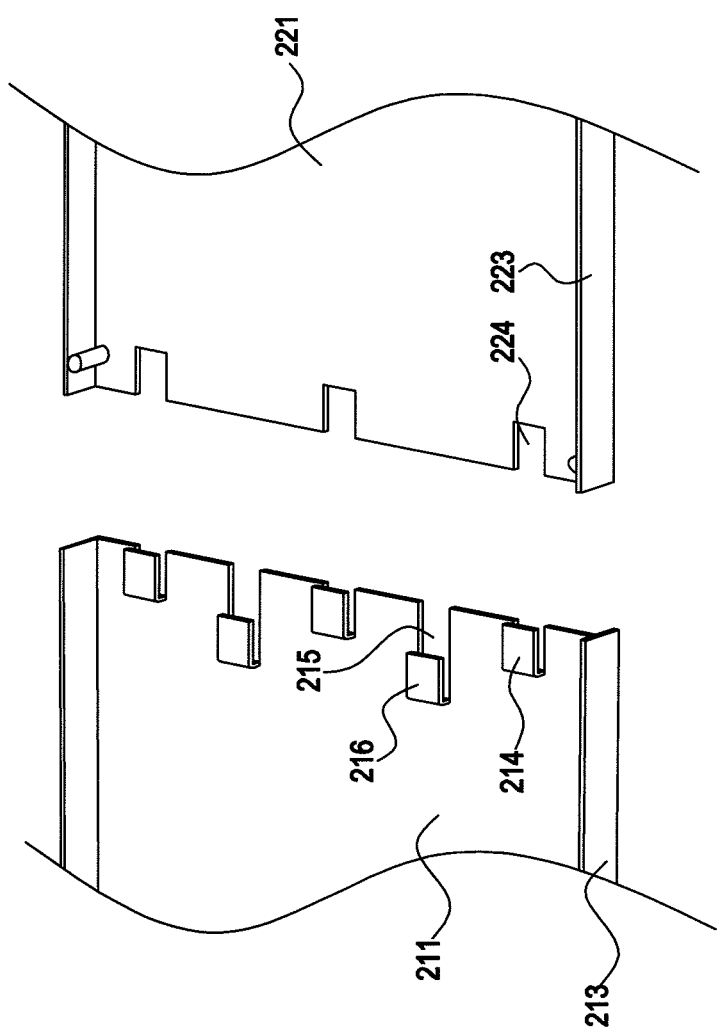
FIG. 5 illustrates a partial enlarged view of a backlight module according to a second embodiment of the present invention.

FIG. 5 illustrates a partial enlarged view of a backlight module 2 according to a second embodiment of the present invention. In the second embodiment, the first backplate unit 21 of the backlight module 2 further comprises a plurality of second notches 215 and a plurality of second upper hooks 216, wherein a distance between the second upper hooks 216 and the front side 2131 is larger than a distance between the first upper hooks 214 and the front side 2131. When the first notches 224 are respectively engaged with the first upper hooks 214 to each other, the second upper hooks 216 are engaged with the back side 2231 of the second backplate body 221. The second notches 215 are formed between the second upper hooks 216 and the front side 2131, and the numbers of the second notches 215 are the same as the numbers of the second upper hooks 216.

Figure 6:
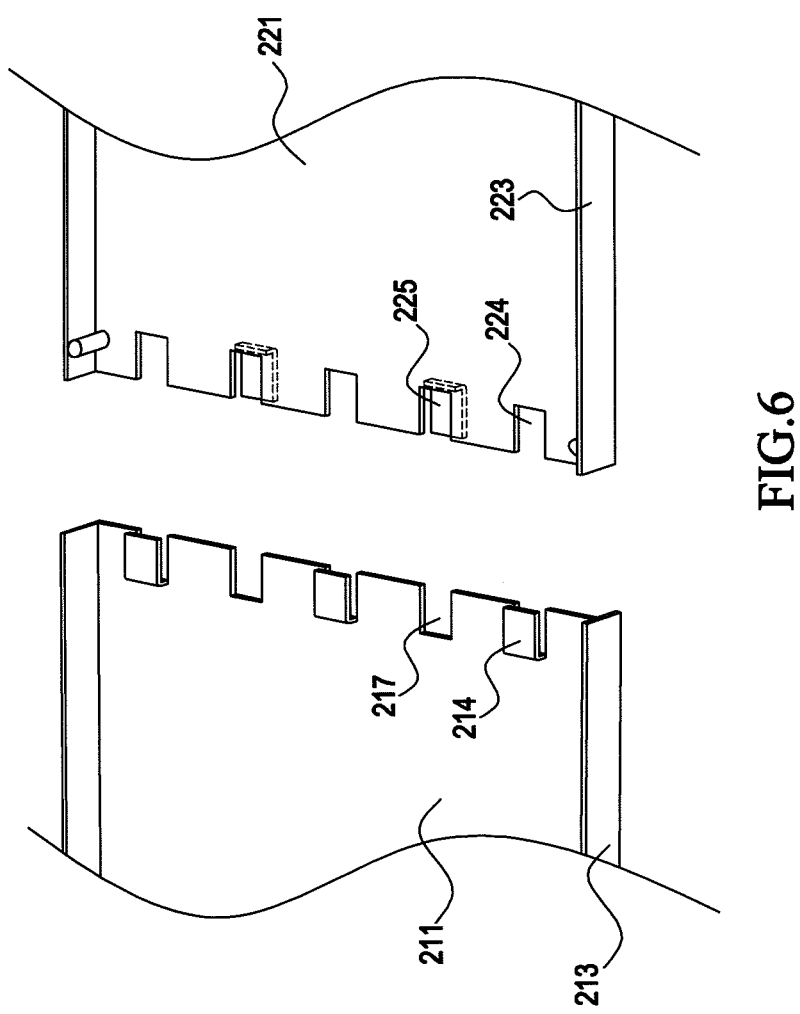
FIG. 6 illustrates a partial enlarged view of a backlight module according to third embodiment of the present invention.

FIG. 6 illustrates a partial enlarged view of a backlight module 2 according to a third embodiment of the present invention. In the third embodiment, the first backplate unit 21 of the backlight module 2 further comprises a plurality of third notches 217 formed on the front side 2131. The backplate unit 22 further comprises a plurality of first lower hooks 225 formed on the back side 2231, wherein the numbers and positions of the third notches 217 are corresponded to the numbers and positions of the first lower hooks 225. When the first notches 224 are respectively engaged with the first upper hooks 214, the third notches 217 are respectively engaged with the first lower hooks 225.

In the above-mentioned embodiments, the width of the front side 2131 is slightly larger than the width of the back side 2231. The front side 2131 is disposed on an outer edge of the back side 2231 when the first backplate unit 21 is engaged with the second backplate unit 22, such that the first backplate unit 21 and the second backplate 22 mutually slide in a lateral direction.

In the backlight module 2, the light source assembly 23 produces a thermal energy, such that the light guide unit 25, the reflection unit 24, and the optical film unit 26 expand by heat. The light guide plate positioning portions 252 are moved in a horizontal direction due to the light guide unit 25 expanding in a horizontal direction, and then the first backplate positioning columns 212 and the second backplate positioning columns 222 are pushed by the light guide plate positioning portions 252, such that the first backplate unit 21 is separated from the second backplate unit 22 based on an expansion value of the light guide unit 25.

Figure 7:
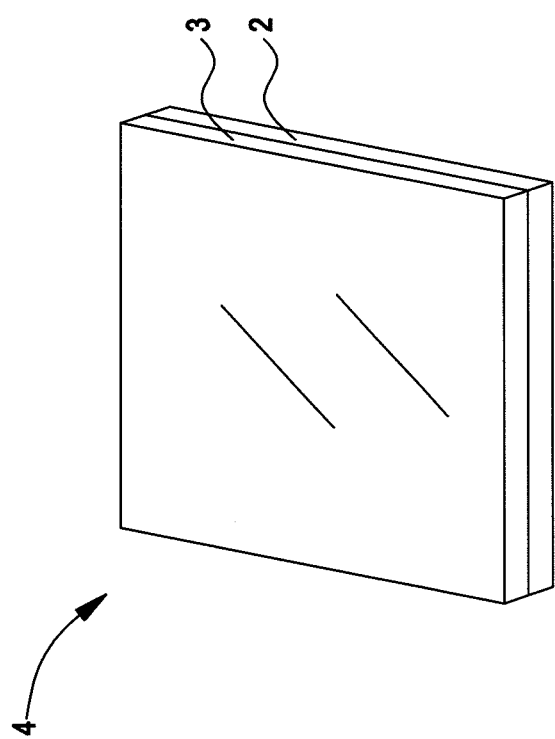
FIG. 7 illustrates a liquid crystal display device of the present invention.

FIG. 7 illustrates a liquid crystal display device 4 of the present invention. As shown in FIG. 7, a liquid crystal display device 4 comprises a liquid crystal module 3 and a backlight module 2. The liquid crystal module 3 is disposed on the backlight module 2, wherein the backlight module 2 may be the backlight unit of the above mentioned embodiments, but the details of devices and structures of the above mentioned embodiments will be omitted herein.

As the foregoing, the backlight module 2 and the liquid crystal display device 4 of the present invention has the advantageous effect in that: the backplate assembly 20 can be detached into the first backplate unit 21 and the second backplate unit 22. With different engaging structures, the backplate assembly 20 extends according to the expansion of the light guide unit 251. Therefore, the problems that the light source unit 25 is pressurized by the expansion of the light guide unit 231 to be broken is solved.

The previous description of the preferred embodiment is provided to further describe the present invention, not intended to limit the present invention. Any modification apparent to those skilled in the art according to the disclosure within the scope will be construed as being included in the present invention.

What is claimed is:

1. A backlight module including a backplate assembly and a light guide unit, the backplate assembly comprising:
   a first backplate unit, comprising:
   a first backplate body formed with three first side walls and an opening along a front side of the first backplate body;
   a plurality of first upper hooks formed on the front side; and
   a plurality of second upper hooks formed on the front side and engaged with a second backplate body; and
   a plurality of third notches formed in the front side, the second backplate body further comprising: a plurality of first lower hooks formed on the back side, numbers and positions of the third notches are respectively corresponded to numbers and positions of the first lower hooks, the third notches and the first lower hooks are respectively engaged with each other, and
   a second backplate unit, comprising:
   the second backplate body, formed with three second side walls and an opening along a back side of the second backplate body; and
   a plurality of first notches, formed on the back side, wherein numbers and positions of the first notches are respectively corresponded to numbers and positions of the first upper hooks, the first notches and the first upper hooks are respectively engaged with each other,
   wherein a width of the front side is slightly larger than a width of the back side, and the front side is disposed on an outer edge of the back side when the first backplate unit is engaged with the second backplate unit, such that the first backplate unit and the second backplate mutually slide in a lateral direction, the first backplate unit is separated from the second backplate unit based on an expansion value of the light guide unit when the light guide unit expands in a horizontal direction by heat,
   wherein a distance between the second upper hooks and the front side is larger than a distance between the first upper hooks and the front side.

2. A backlight module comprising:
   a backplate assembly, comprising:
   a first backplate unit, comprising:
   a first backplate body formed with three first side walls and an opening along a front side of the first backplate body;
   a plurality of first upper hooks formed on the front side, and
   a plurality of second upper hooks formed on the front side and engaged with a second backplate body; and
   a second backplate unit, comprising:
   the second backplate body formed with three second side walls and an opening along a back side of the second backplate body; and a plurality of first notches formed on the back side, wherein numbers and positions of the first notches are respectively corresponded to numbers and positions of the first upper hooks, the first upper hooks and the first notches are respectively engaged with each other, and a light guide unit, wherein a distance between the second upper hooks and the front side is larger than a distance between the first upper hooks and the front side.

3. The backlight module of claim 2, wherein the first backplate unit further comprises a plurality of third notches formed on the front side, the second backplate unit further comprises a plurality of first lower hooks formed on the back side, numbers and positions of the third notches are respectively corresponded to numbers and positions of the first lower hooks, the third notches and the first lower hooks are respectively engaged with each other.

4. The backlight module of claim 2, wherein a width of the front side is slightly larger than a width of the back side, and the front side is disposed on an outer edge of the back side when the first backplate unit is engaged with the second backplate unit, such that the first backplate unit and the second backplate mutually slide in a lateral direction.

5. The backlight module of claim 2, wherein the first backplate unit is separated from the second backplate unit based on an expansion value of the light guide unit when the light guide unit expands in a horizontal direction by heat.

6. A liquid crystal display device, comprising:

a liquid crystal module and a backlight module, the backlight module comprises a backplate assembly and a light guide unit, and the backplate assembly, comprising:

a first backplate unit, comprising:

a first backplate body forming with three first side walls and an opening along a front side of the first backplate body;

a plurality of first upper hooks formed on the front side, and a plurality of second upper hooks formed on the front side and engaged with a second backplate body; and a second backplate unit, comprising:

the second backplate body formed with three second side walls and an opening along a back side of the second backplate body; and a plurality of first notches formed on the back side, wherein numbers and positions of the first notches are respectively corresponded to numbers and positions of the first upper hooks, the first notches and the first upper hooks are respectively engaged with each other, wherein a distance between the second upper hooks and the front side is larger than a distance between the first upper hooks and the front side.

7. The liquid crystal display device of claim 6, wherein the first backplate unit further comprises a plurality of third notches formed in the front side, the second backplate unit further comprises a plurality of the first lower hooks formed on the back side, numbers and positions of the third notches are respectively correspond to numbers and positions of the first lower hooks, the third notches are respectively engaged with the first lower hooks.

8. The liquid crystal display device of claim 6, wherein a width of the front side is slightly larger than a width of the back side, and the front side is disposed on an outer edge of the back side when the first backplate unit is engaged with the second backplate unit, such that the first backplate unit and the second backplate mutually slide in a lateral direction.

9. The liquid crystal display device of claim 6, wherein the first backplate unit is separated from the second backplate unit based on an expansion value of the light guide unit when the light guide unit expands in a horizontal direction by heat.

* * * * *